United States Patent [19]

Zatkos

[11] Patent Number: 4,920,671
[45] Date of Patent: May 1, 1990

[54] MALE COMPONENT FOR TWO-PIECE ANIMAL EAR TAG

[75] Inventor: Robert J. Zatkos, Cody, Wyo.

[73] Assignee: Y-TEX Corporation, Cody, Wyo.

[21] Appl. No.: 704,159

[22] Filed: Feb. 22, 1985

[51] Int. Cl.$^5$ ............................................. G09F 3/00
[52] U.S. Cl. ......................................... 40/301; 63/12;
40/304
[58] Field of Search .................... 40/300, 301, 304;
604/272; 63/12

[56] References Cited

U.S. PATENT DOCUMENTS

| | | | |
|---|---|---|---|
| 2,512,569 | 6/1950 | Saffir | 40/301 X |
| 2,513,569 | 6/1950 | Saffir | 604/272 |
| 3,260,007 | 7/1966 | Hayes | 40/301 |
| 3,731,414 | 5/1973 | Murphy et al. | 40/301 |
| 3,741,414 | 5/1973 | Murphy et al. | 40/301 |
| 4,021,952 | 5/1977 | Brierley | 40/301 |
| 4,176,482 | 12/1979 | Steckel | 40/301 |
| 4,209,924 | 7/1980 | Fearing | 40/301 |

FOREIGN PATENT DOCUMENTS 1219533  1/1971  United Kingdom ................ 40/301

*Primary Examiner*—Kenneth J. Dorner
*Assistant Examiner*—Wenceslao J. Contreras
*Attorney, Agent, or Firm*—Willian, Brinks, Olds, Hofer, Gilson & Lione

[57] ABSTRACT

An improved male component for a two-piece animal ear tag in which the male component is of one-piece construction, and is formed of at least two compatible plastic materials. The male component includes a flexible tab at one end, a hollow, elongated stem extending from the flexible tab, and an integral, hard tip formed on the end of the stem opposite the tab. The plastics blend with each other to an extent sufficient to form a secure junction, thereby creating male component formed of a unitary piece of plastic.

9 Claims, 1 Drawing Sheet

U.S. Patent
May 1, 1990
4,920,671
FIG. 1
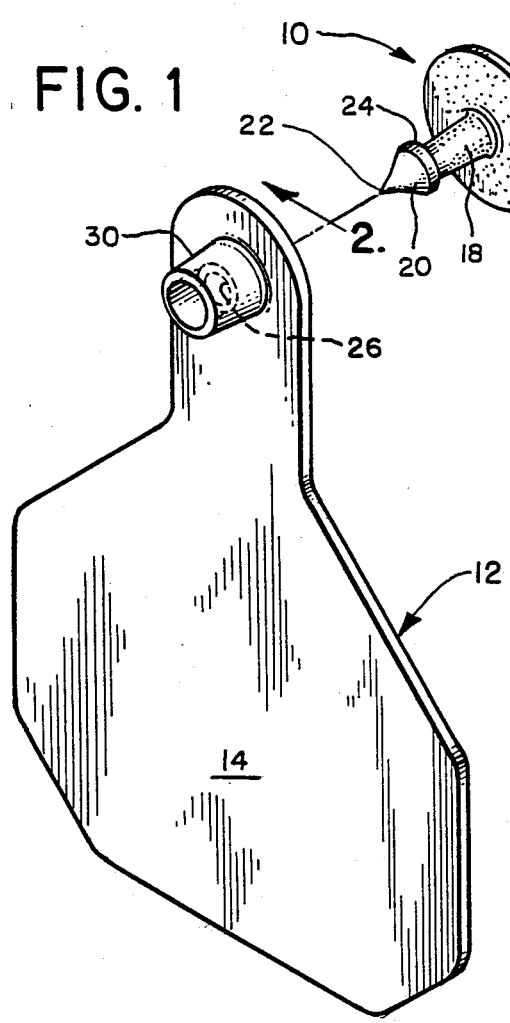
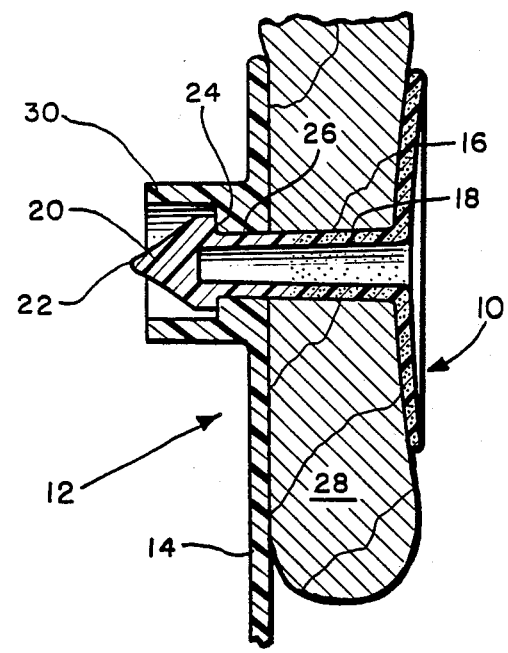
FIG. 2
FIG. 3
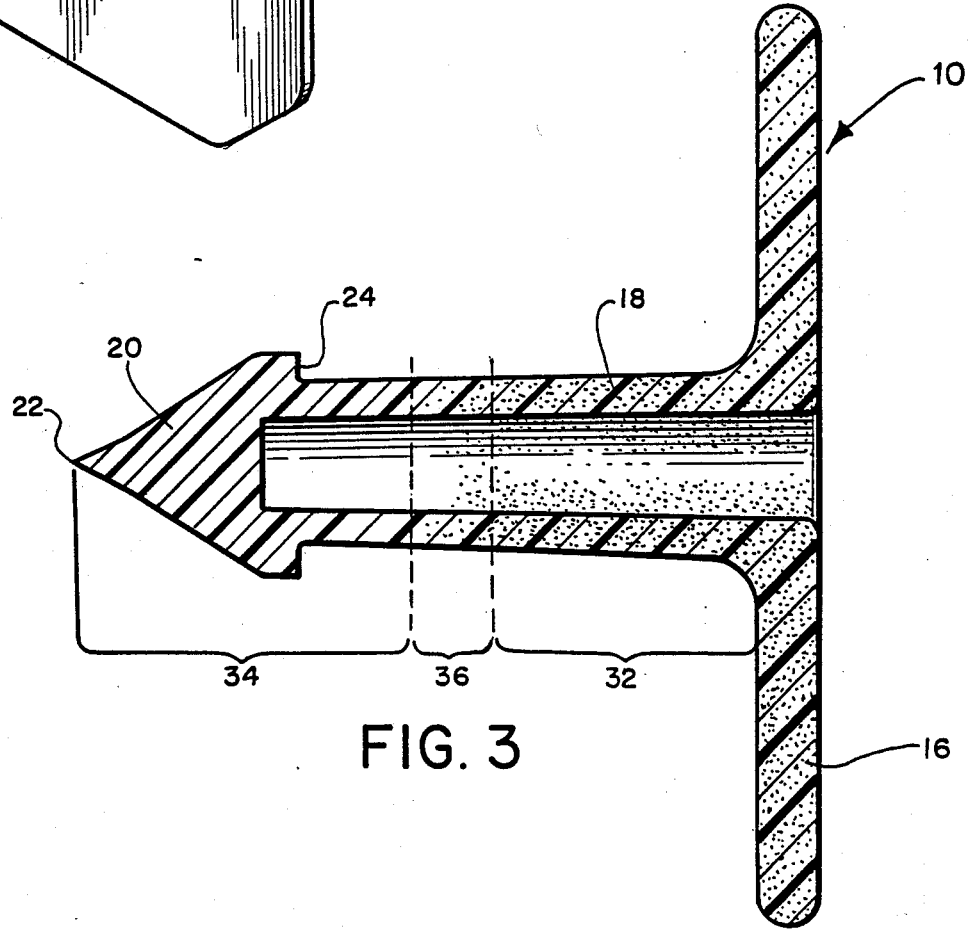

MALE COMPONENT FOR TWO-PIECE ANIMAL EAR TAG

This is a continuation of application Ser. No. 488,357, filed Apr. 25, 1983, now abandoned.

The present invention relates to improvements in animal ear tags, and more specifically to an improved male component for a two-piece animal ear tag.

Two-piece animal ear tags are well known in the art. Examples of such tags are shown in Fearing, U.S. Pat. No. 4,209,824; in Murphy et al., U.S. Pat. No. 3,731,414; and in Goldberg, New Zealand Patent No. 141,589. A widely used two-piece tag comprises a hollow-stemmed male component made of soft, resilient plastic, having a hard tip at one end. The male component is designed to be passed through the ear of an animal and to be mated with a female component. When such tags are used for animal identification, and the information-carrying portion of the tag may form part of either or both components. Conventionally, the information-carrying portion forms part of the female component. Such a design is advantageous because both the female component and the male component are made entirely of flexible material (except, of course, for the tip of the male component). Such tags have the advantage that they resist snagging on fences, trees, and the like, and therefore have a reduced tendency to become detached from the animal.

In order to aid in penetrating the ear of an animal, the male component is conventionally inserted with a pliers-type applicator having a stiffening rod which passes through the hollow stem. The stiffening rod conventionally mates with the tip of the male member, which is typically made of brass, another metal, or a hard plastic. This tip may be pointed or may have an opening in the end. Where the tip is open at the end, the stiffening rod is conventionally pointed to assist in piercing the animal's ear. Tags of these types are marketed commercially in the United States under the trade names "Temple" by Temple Tag Co., Temple Tex.; "Fearing" by Fearing Manufacturing Co., South St. Paul, Minn.; "Allflex" by Allflex Tag Co., Los Angeles, Calif.; and "All American" by Y-Tex Corporation, Cody, Wyo.

A problem that is encountered with a separate tip component is that the tip sometimes becomes detached from the remainder of the male portion when the tag is installed on an animal.

Another problem is that, because the stem of the male component is soft and flexible, the tip can sometimes tilt off axis during installation if it is not securely engaged by the support rod. This tendency may be reduced by providing a mechanical engagement between the support rod and the tip. However, such mechanical engagement itself presents a number of difficulties.

First, mechanical engagement between the tip and the support rod requires that the tip be made of a relatively complex shape, thus greatly increasing the cost of manufacture. Second, if the support rod does not pass entirely through the tip, it is sometimes difficult for the user to determine that the support rod has been inserted into the stem a sufficient distance to effect the mechanical engagement. Third, if the tip has an opening permitting the support rod to pass entirely through it, the support rod has a tendency to carry infection from one animal to another, and thus should be sterilized or treated with a suitable disinfectant prior to each use.

A fourth problem is that these two-piece male components are difficult and expensive to manufacture. In order to mate the separate tip with the rest of the male component, it is necessary to insert the tip into the mold prior to the injection molding of the component. The tips and their insertion represent a major portion of the overall cost of manufacture for the male component.

SUMMARY OF THE INVENTION

It has now been found that desired resistance to snagging may be obtained without providing the male component with an entirely flexible stem. That is, it is only important that the portion of the stem adjacent to the tab be relatively flexible, in order that the tab itself may flex to reduce snagging. It has also been found that a stem which is relatively rigid adjacent to the hard tip portion provides increased mechanical stability and resistance to tilting of the tip portion without any need for a mechanical engagement. Finally, it has been found that significant manufacturing economies may be achieved with a tag that may be entirely formed of a single piece of plastic material having the desired characteristics.

Accordingly, the present invention provides an improved male component for a two-piece animal ear tag. The male component is made of one-piece construction, and includes a relatively flexible tab portion at one end, a hollow, elongated stem extending from the flexible tab, and an integral, relatively hard tip portion formed on the end of the stem opposite the tab. The stem has a relatively flexible zone adjacent to the tab and a relatively rigid zone adjacent to the tip.

The male component is formed of at least two plastics of differing hardness which are compatible, that is, which may blend with each other to an extent sufficient to form a secure junction, thereby creating a unitary piece of plastic material.

BRIEF DESCRIPTION OF THE DRAWINGS

FIG. 1 is a perspective view of a preferred embodiment of the one-piece male component of this invention, shown together with a female tag component.

FIG. 2 is a cross-sectional view of the male and female components of FIG. 1 depicting the tag positioned in the ear of an animal.

FIG. 3 is a cross-sectional view of the one-piece male component taken along lines 2—2 of FIG. 1.

DETAILED DESCRIPTION OF THE INVENTION AND PREFERRED EMBODIMENTS

Referring to the drawings, and particularly to FIG. 1, a male component for an animal ear tag in accordance with the present invention is generally indicated by reference numeral 10. The male component 10 is shown together with a female component 12. In the embodiment shown, the female component 12 includes an information-carrying portion 14 upon which numbers or other suitable indicia may be placed. As is well known in the art, the information-carrying portion may alternatively form part of the male component 10, or both the male and female components 10, 12, respectively, may have information-carrying portions. As is also well known in the art, animal ear tags may be used for purposes other than, or in addition to, the display of information. Thus, the male component 10 and/or the female component 12 may be used to carry an insecticide, for example.

In the preferred embodiment shown, the male component 10 includes a tab portion 16, a hollow, elongated stem portion 18, and a tip portion 20, all of a unitary piece of material. As described below, the tip portion 20 is made of a hard plastic, and preferably includes a pointed spike 22. The rear of the tip portion 20 is of a greater diameter than the stem 18, and forms a shoulder portion 24, enabling it to engage the female component 12, as hereinafter described.

The female component 12 has a aperture 26 which has a diameter smaller than the diameter of the shoulder portion 24. Because the female component 12 is made of flexible, resilient material, the tip portion 20 may be forced through the aperture 26 to engage the female component 12 in a secure fashion as shown in FIG. 2. FIG. 2 also shows a portion of an animal's ear 28, illustrating the manner in which an ear tag incorporating the male component of the present invention is installed. The female component 12 also conventionally includes a boss 30 surrounding the aperture 26.

As shown in FIG. 2, the spike 20 is conventionally blunted during installation by being forced against a hard surface on the jaw of the applicator (not shown) which holds the female component 12. This blunting reduces the risk of injury to the animal after the tag is installed.

Referring now to FIG. 3, in accordance with the invention, the elongated stem portion 18 includes a relatively soft, flexible region 32, a relatively hard, rigid region 34, and a transition zone 36. Thus, the tip 20 and portion of the stem 18 adjacent thereto will be made of relatively hard material, while the tab 16 and portion of the stem 18 adjacent thereto will be made of relatively soft, flexible material. This construction is particularly advantageous in that the portion of the stem 18 adjacent to the tip 20 is stiffened, and thus the tendency of the tip 20 to tilt during installation is reduced to the point that mechanical engagement between the tip 20 and the support rod (not shown) used during installation is not necessary. Of course, it is within the scope of the present invention to continue to provide for such mechanical engagement if added resistance to tilting is desired.

As is well known in the art, two-piece ear tags are conventionally installed by using a pliers-type device having a support rod (not shown) which fills the hollow stem 18. Suitable devices are shown and described, for example, in U.S. Pat. Nos. 3,731,141 and 4,120,303.

In the most preferred embodiment shown, the interior of the stem 18 is tapered so that the internal diameter is slightly smaller toward the tip. When the support rod (not shown) is similarly tapered, such construction facilitates the placing of the male component 10 on the support rod, since there will be relatively little frictional engagement between the two until the male component 10 is nearly fully engaged on the support rod. Such a construction has the additional advantage that a greater thickness of material is provided in the portion of the stem 18 adjacent to the tip portion 20, thus providing a desirable further increase in rigidity in this portion of the stem 18.

The tag of the present invention is preferably manufactured by a technique known as "co-molding," wherein two compatible plastics are simultaneously injected through separate ports into an injection mold. Thus, a hard plastic is injected at a port near the tip 20, while a soft plastic is injected at a port near the opposite end of the male component 10. It is important that the two plastics be compatible so that they will flow together in the transition zone 36. Of course, the male component 10 may be formed of three or more compatible plastics if it is desired to even more precisely regulate the relative hardness of the flexible region 32, the rigid region 34, and the transition zone 36. However, in accordance with the preferred embodiment, two plastics are employed.

As used herein, the terms "relatively flexible" and "relatively hard" refer to the flexibility and hardness of the two plastic materials relative to one another. As is well understood in the art, the relatively flexible material should be sufficiently soft and pliable to resist snagging, yet should be sufficiently tough to withstand years of wear when installed on an animal. Similarly, the relatively hard material should be sufficiently hard to aid in piercing an animal's ear. Similarly, the term "relatively rigid" refers to the rigidity of structure inherently contributed by the use of a relatively hard material. Of course, rigidity is influenced by structure, such as wall thickness, as well as the hardness of the material.

Of course, when the relatively hard material includes a pointed spike 22, a high degree of hardness is more important than if the tip 20 has an opening instead of a spike, and penetration of the ear is performed by a pointed support rod (not shown). Because flexible two-piece animal ear tags are now well known in the art, it is well within the ability of one of ordinary skill in the art to select suitable plastic materials.

In the preferred embodiment, the relatively hard plastic used for the tip portion 20 should have a Shore D hardness of at least about 80. There is, of course, no upper limit on the desired hardness of this material. The soft portion of the tag should preferably have a Shore A hardness of about 75–90, and most preferably about 80–90.

At the present time, it is contemplated that the most preferred plastics for both the hard spike and the soft tab are polyurethanes having hardnesses in the foregoing ranges. A particularly preferred soft polyurethane is sold by the Upjohn Company under the trade name PELLETHANE CPR 2102-90A. A particularly preferred hard polyurethane is sold by the same company under the trade name ISOPLAST 101. Of course, any two compatible plastics may be employed, and they need not both be of the same type. For example, the spike 20 can be formed of hard plastics such as polycarbonates, polyvinyl chloride, and ABS, all of which are compatible with soft polyurethanes. By the same token, other soft plastics, such as polyvinyl chlorides, may be employed together with suitable compatible hard materials. The chemical identity of the two plastics is not important, so long as they have the requisite physical characteristics and compatibility.

The co-molding of the male component of the present invention may be carried out with any injection molding machine having multiple barrels which enable the simultaneous injection molding of two or more plastics. For example, a two-color machine may be employed. Such machines are available commercially from the Nissei Plastic Industrial Co. under the trade names of Two-Color DC Series 100–200 and 100–300. By controlling the temperature of the material and of the mold, along with the injection and injection speed at each of the barrels, the precise position of the transition zone 36 may be controlled.

Obviously, many modifications and variations of the invention as set forth above will occur to those skilled in the art, and it is intended to cover in the appended claims all such modifications and variations as falling within the true spirit and scope of the invention.

I claim:

1. A male component for a two-piece animal ear tag comprising:
   a tab portion formed of a relatively flexible plastic material;
   a tip portion formed of a relatively hard plastic material; and
   a hollow stem portion joining said tab and tip portions, said stem portion being unitary and including a relatively flexible portion adjacent to said tab, a relatively hard portion adjacent to said tip, and a transition zone between said relatively flexible portion and said relatively hard portion, said plastics being blended in said transition zone to form a unitary piece of plastic material.

2. The male component as defined in claim 1 wherein said male component is formed from two plastic materials.

3. The male component as defined in claim 2 wherein said tip portion is formed of a material having a Shore D hardness of at least about 80, said tab portion being formed of a material having a Shore A hardness of about 75-90.

4. The male component as defined in claim 3 wherein said tab portion is formed of a material having a Shore A hardness of about 80-90.

5. The male component as defined in claim 2 wherein said relatively flexible portion is formed of a polyurethane.

6. The male component as defined in claim 5 wherein said relatively flexible portion and said relatively hard portion are both formed of polyurethanes.

7. The male component as defined in claim 1 wherein the interior of said hollow stem portion is tapered with the internal diameter adjacent to said tip portion being smaller than the internal diameter adjacent to said tab portion.

8. A male component for a two-piece animal ear tag comprising:
   a tab portion formed of a plastic material having a Shore A hardness of about 80-90;
   a tip portion formed of a plastic material having a Shore D hardness of at least about 80; and
   a hollow stem portion joining said tab and tip portions, said stem portion being unitary and including a relatively flexible portion adjacent to said tip, and a transition zone between said relatively flexible portion and said relatively hard portion, said plastics being blended in said transition zone to form a unitary piece of plastic material, the interior of said hollow stem portion being tapered with the internal diameter adjacent to said tip portion being smaller than the internal diameter adjacent to said tab portion.

9. The male component as defined in claim 8 wherein said relatively flexible portion and said relatively hard portion are both formed of polyurethanes.

* * * * *